H. J. GILBERT.
PULLEY.
APPLICATION FILED JULY 19, 1904.
966,541.
Patented Aug. 9, 1910.
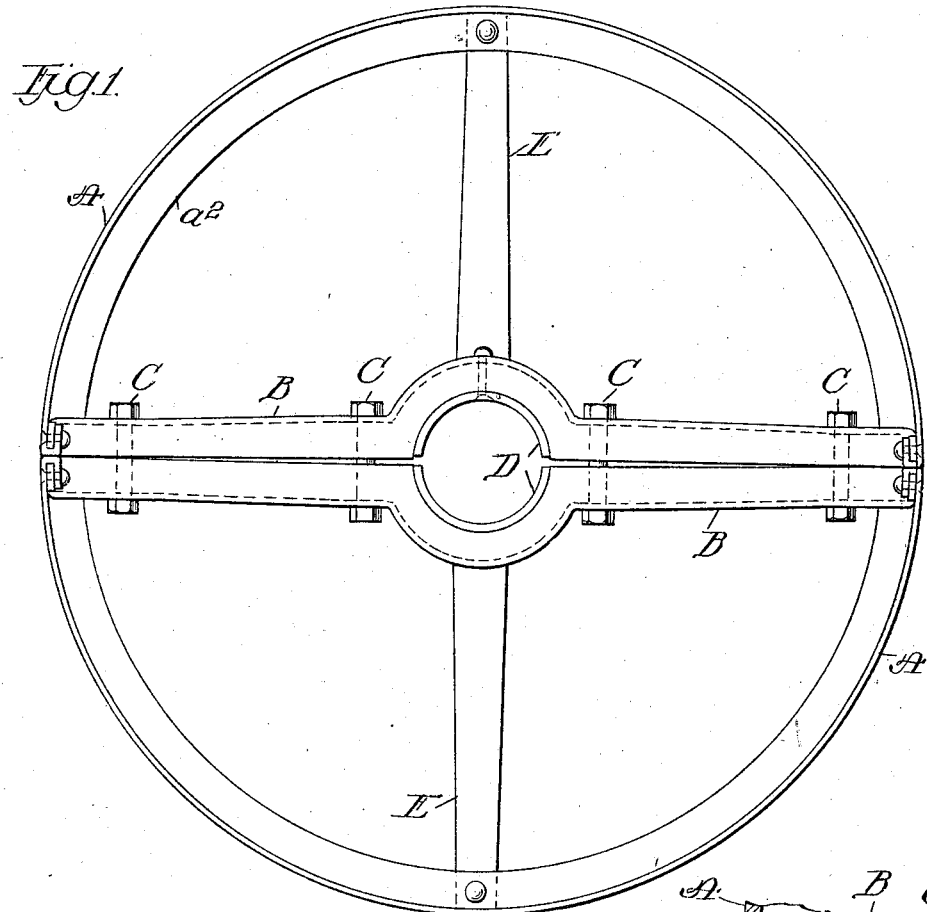
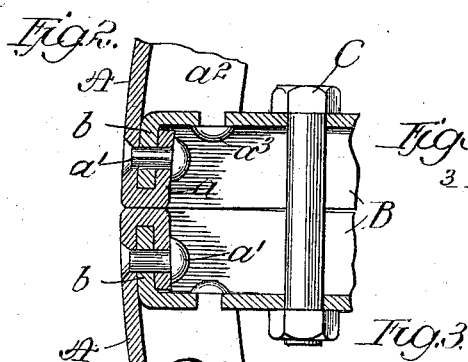
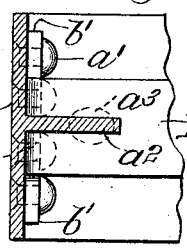
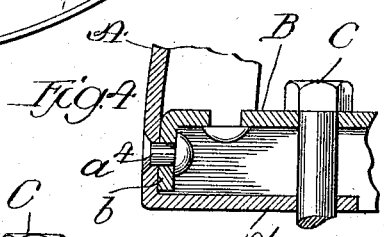
Witnesses:
Edw. P. Barrett
Louis B. Erwin
Inventor
Henry J. Gilbert
By Rector & Hibben
His Attys.

UNITED STATES PATENT OFFICE.

HENRY J. GILBERT, OF SAGINAW, MICHIGAN.

PULLEY.

966,541.  Specification of Letters Patent.  Patented Aug. 9, 1910.

Application filed July 19, 1904. Serial No. 217,244.

*To all whom it may concern:*

Be it known that I, HENRY J. GILBERT, a citizen of the United States, residing at Saginaw, in the county of Saginaw and State of Michigan, have invented certain new and useful Improvements in Pulleys, of which the following is a specification.

My invention pertains to pulleys and the like, more particularly to pulleys constructed of sheet metal and of the split type, and the object thereof is to produce a pulley of this character so constructed and arranged as to possess the required elements of strength, rigidity and durability.

The various features of advantage and utility of my present construction of pulley will be apparent from the description hereinafter given.

In the drawing, Figure 1 is a side elevation of my improved pulley; Fig. 2 a section taken through one set of meeting ends of the pulley halves and through one end of the spoke arms; Fig. 3 a section on line 3—3 of Fig. 5; Fig. 4 a section similar to Fig. 2 of a modified form of construction; Fig. 5 a similar section illustrating substantially the same construction shown in Fig. 2 but with the inturned ends of the rim segment or T-iron of less length; and Fig. 6 a cross section of the spoke arm.

Referring to the pulley construction illustrated in Figs. 1 and 2, the rim comprises two semi-circular halves or rim segments A, which are what are known as T-irons. By preference, and as shown in said figures, the web portions of these T-irons or rim segments do not extend as far as the meeting or division line between the two pulley halves, but terminate some distance therefrom, equal to the thickness of the spoke arms. The flange portions of each T-iron are turned or folded inwardly and the extreme end $a$ is reversely folded parallel to the rim face, in such manner as to form a socket at each end of the segment.

The spoke arms B B are approximately U-shape in cross-section and extend diametrically across the pulley structure, with their opposite ends connected, and by preference interlocked, with the meeting ends of the rim segments. These spoke arms are similar in construction, each comprising a curved hub portion forming a shaft bore or opening and two portions extending radially therefrom to the meeting ends of the rim segments. The inner edges of these spoke arms are slightly separated from each other, so that the same may be clamped together and upon a shaft by means of clamping bolts C. These spoke arms may be clamped directly upon the shaft or through the medium of a bushing D, here shown as of the split type. In the present instance a separate or supplemental set of spoke arms E is employed, but the same are immaterial so far as my present invention is concerned.

In order to adapt the spoke arms B B for interlocking connection or engagement with the ends of the rim segments constructed as described, the end of each spoke arm is formed with a middle tongue $b$ and two side tongues $b'$, which latter tongues are bent outwardly or laterally at right angles to the side or body of the spoke arm, as illustrated in Fig. 3, while the middle tongue is bent downwardly. These tongues are received by and fit into the sockets or recesses formed by the extreme ends $a$ of the rim segments. According to the construction illustrated in Figs. 1 and 2 the ends of the spoke arms are not only interlocked with the ends of the rim segments, but are also secured thereto by means of rivets $a'$, as clearly illustrated in Fig. 2. Furthermore, the body portion of each spoke arm is secured to the web portion $a^2$ of its rim segment by means of a rivet $a^3$, which is formed from the material of the web portion itself and extends through the flattened top of the spoke arm against whose under side it is headed over or riveted, in the manner clearly indicated in Figs. 2, 4 and 5. It will be understood that the flange portions of the T-irons, constituting the rim segments, may be formed or rolled as wide as found necessary or desirable for actual service conditions.

Referring to Fig. 4, the construction constituting the connection between the spoke arm and its rim segment is substantially the same as that already described, with the exception that the extreme end A' of the flange portion of the rim segment, instead of being folded reversely parallel to the pulley face, is made of greater length than that illustrated in Fig. 2 and extended on a radius, that is, toward the center of the pulley structure. In this construction short rivets $a^4$ are passed through the tongues on the spokes and through the flange portions of the rim segments, as illustrated in Fig. 4, and moreover the extreme ends of the inturned portions A' are provided with bolt holes or openings to receive the clamping bolts C. The construction illustrated in Fig. 5 is the same as that shown in Fig. 4, with the exception that the inturned ends of the flange portions A² of the rim segments terminate immediately adjacent the end tongues of their spoke arms, instead of continuing radially as far as the clamping bolts.

Although I have described more or less precise forms and details of construction, I do not intend to be understood as limiting myself thereto, as I contemplate changes in form, proportion of parts and the substitution of equivalents as circumstances may require or render expedient, and without departing from the spirit and scope of my invention and claims.

I claim:

1. A pulley comprising spoke arms and T-irons forming rim segments and connected with the ends of such spoke arms, the web portions of the T-irons being cut away and longitudinally disposed lugs formed thereon making rivet connections with said spoke arms, and the flange portions of the T-irons being inturned at their meeting ends; substantially as described.

2. A split pulley, each half thereof comprising a spoke arm and a T-iron forming the rim structure and to whose flange portion the ends of such spoke arm are connected, the web portion of the T-iron being cut away and a longitudinally disposed lug formed thereon making a rivet connection with said spoke arm and the flange portion of the T-iron being extended beyond its web portion and being inturned at its ends; substantially as described.

3. A split pulley, each half thereof comprising a spoke arm and a T-iron forming the rim structure, the web portion of the T-iron being cut away and a longitudinally disposed lug formed thereon making a rivet connection with said spoke arm and the flange portion of the T-iron being inturned at its ends; substantially as described.

4. A split pulley, each half thereof comprising a spoke arm and a T-iron forming the rim structure and to whose web and flange portions the ends of the spoke arm are connected, the web portion of the T-iron being cut away and a longitudinally disposed lug formed thereon making a rivet connection with said spoke arm and the flange portion of the T-iron being inturned at its ends; substantially as described.

5. A split pulley, each half thereof comprising a spoke arm and a T-iron riveted as to its flange and web portions to the spoke arm, the web portion of the T-iron being cut away and a longitudinally disposed lug formed thereon making a rivet connection with said spoke arm and the flange portion of the T-iron being inturned at its ends; substantially as described.

6. A split pulley, each half thereof comprising a spoke arm having outwardly bent end tongues, and a T-iron forming the rim structure and having its flange portions connected with such end tongues; substantially as described.

7. A split pulley, each half thereof comprising a spoke arm having end tongues, and a T-iron forming the rim structure and having its flange portions extended beyond the end of its web portion and connected with such end tongues; substantially as described.

8. A split pulley, each half thereof comprising a spoke arm having end tongues, and a T-iron forming the rim structure and having its flange portions extended beyond the end of its web portions and connected with such end tongues, and having such web portion connected with the body of the spoke arm; substantially as described.

9. A split pulley, each half thereof comprising a spoke arm and a T-iron whose ends are interlocked with the ends of the spoke arm; substantially as described.

10. A split pulley, each half thereof comprising a spoke arm having laterally extended end tongues, and a T-iron whose ends are interlocked with the tongues of the spoke arm; substantially as described.

11. A split pulley, each half thereof comprising a spoke arm approximately U-shape in cross-section, and a T-iron forming a rim structure or segment having its flange portion inturned at its ends and connected to the ends of the spoke arm; substantially as described.

12. A split pulley, each half thereof comprising a spoke arm approximately U-shape in cross-section and having laterally extended end tongues, and a T-iron forming a rim structure or segment and connected at its ends to said end tongues; substantially as described.

13. A split pulley, each half thereof comprising a spoke arm approximately U-shape in cross section and having a middle end tongue and two lateral end tongues, and a T-iron forming a rim segment and having its flange portions connected with said tongues; substantially as described.

14. A split pulley, each half thereof comprising a spoke arm approximately U-shape in cross-section and having a middle end tongue and two lateral end tongues, and a T-iron forming a rim segment and having its ends interlocked with said tongues; substantially as described.

15. A split pulley, each half thereof comprising a spoke arm approximately U-shape in cross-section and having a middle end tongue and two lateral end tongues, and a T-iron forming a rim segment and having its ends connected with said tongues and its web portion connected with the body portion of the spoke arm; substantially as described.

16. A split pulley, each half thereof comprising a spoke arm approximately U-shape in cross-section and having a middle end tongue and two lateral end tongues, and a T-iron forming a rim segment and having its ends interlocked with said tongues and the ends of its web portion riveted to the flat or body portion of the spoke arm; substantially as described.

17. A split pulley, each half thereof comprising a spoke arm having laterally extended end tongues, and a T-iron whose flange portions are extended and inwardly and reversely folded to form sockets to receive the tongues of the spoke arm; substantially as described.

18. A split pulley, each half thereof comprising a spoke arm approximately U-shaped in cross section, and a rim structure or segment formed of a solid strip of iron T-shaped in cross-section and connected at its ends to the ends of the spoke arm, the web portion of the T-iron terminating at the points of intersection with the cross web of the spoke arm and being connected therewith; substantially as described.

19. A split pulley comprising spoke arms substantially U-shape in cross section and rim segments formed of solid strips of iron T-shaped in cross section and connected with the opposite ends of the spoke arms both as to the web and flange portions thereof, the web portions being cut away to accommodate these spoke arms; substantially as described.

20. A pulley comprising spoke arms and T-irons forming rim segments and connected with the ends of such spoke arms, the web portions of the T-irons being cut away and longitudinally disposed lugs formed thereon making rivet connections with the spoke arms.

21. A split pulley, each half thereof comprising a spoke arm, and a T-iron forming the rim structure, the web portion of the T-iron being cut away and a longitudinally disposed lug formed thereon making a rivet connection with the spoke arm.

22. A split pulley, each half thereof comprising a spoke arm and a T-iron forming the rim structure and to whose web and flange portions the ends of the spoke arm are connected, the web portion of the T-iron being cut away and a longitudinally disposed lug formed thereon making a rivet connection with the spoke arm.

23. A pulley comprising spoke arms and T-irons forming the rim structure. said spoke arms being connected with the T-irons, both as to their web and flange portions, and the web portions being cut away to accommodate the spoke arms; substantially as described.

HENRY J. GILBERT.

Witnesses:
 ARNOLD BOUTELL,
 W. H. REED.